United States Patent [19]
Moriyama

[11] Patent Number: 5,757,276
[45] Date of Patent: May 26, 1998

[54] COMMUNICATION PORT CONTROL SYSTEM

[75] Inventor: Junichi Moriyama, Kawasaki, Japan

[73] Assignee: Fujitsu Limited, Kanagawa, Japan

[21] Appl. No.: 751,373

[22] Filed: Nov. 19, 1996

Related U.S. Application Data

[63] Continuation of Ser. No. 595,509, Feb. 1, 1996, abandoned, which is a continuation of Ser. No. 386,226, Feb. 9, 1995, abandoned, which is a continuation of Ser. No. 212,305, Mar. 14, 1994, abandoned, which is a continuation of Ser. No. 769,205, Sep. 30, 1991, abandoned.

[30] Foreign Application Priority Data

Oct. 3, 1990 [JP] Japan ................................. 2-265491

[51] Int. Cl.⁶ ..................................................... H04Q 1/00
[52] U.S. Cl. ........................... 340/825.04; 340/825.08; 340/825.51; 370/449
[58] Field of Search .................... 340/825.02, 825.04, 340/825.08, 825.5; 370/449

[56] References Cited

FOREIGN PATENT DOCUMENTS

| | | |
|---|---|---|
| 56-129943 | of 1981 | Japan. |
| 61-30139 | of 1986 | Japan. |
| 61-30139 | 2/1986 | Japan. |
| 62-241056 | of 1987 | Japan. |
| 63-268060 | of 1988 | Japan. |
| 2-128542 | of 1990 | Japan. |
| 2-285762 | of 1990 | Japan. |

*Primary Examiner*—Brian Zimmerman
*Attorney, Agent, or Firm*—Helfgott & Karas, P.C.

[57] ABSTRACT

A communication port control system which controls the use of communication ports for making a communication between a main station and a plurality of sub stations, and includes a processing unit for processing data received from the sub stations, and a logical sum unit for obtaining a logical sum of the data received from the sub stations and for supplying the logical sum to the processing unit via the communication ports. A judging unit is provided in the control system for judging a sub station number of the sub station from which the data received by the logical sum unit originates and for supplying the sub station number to the processing unit. The logical sum unit receives the data from only one of the sub stations at one time.

11 Claims, 6 Drawing Sheets

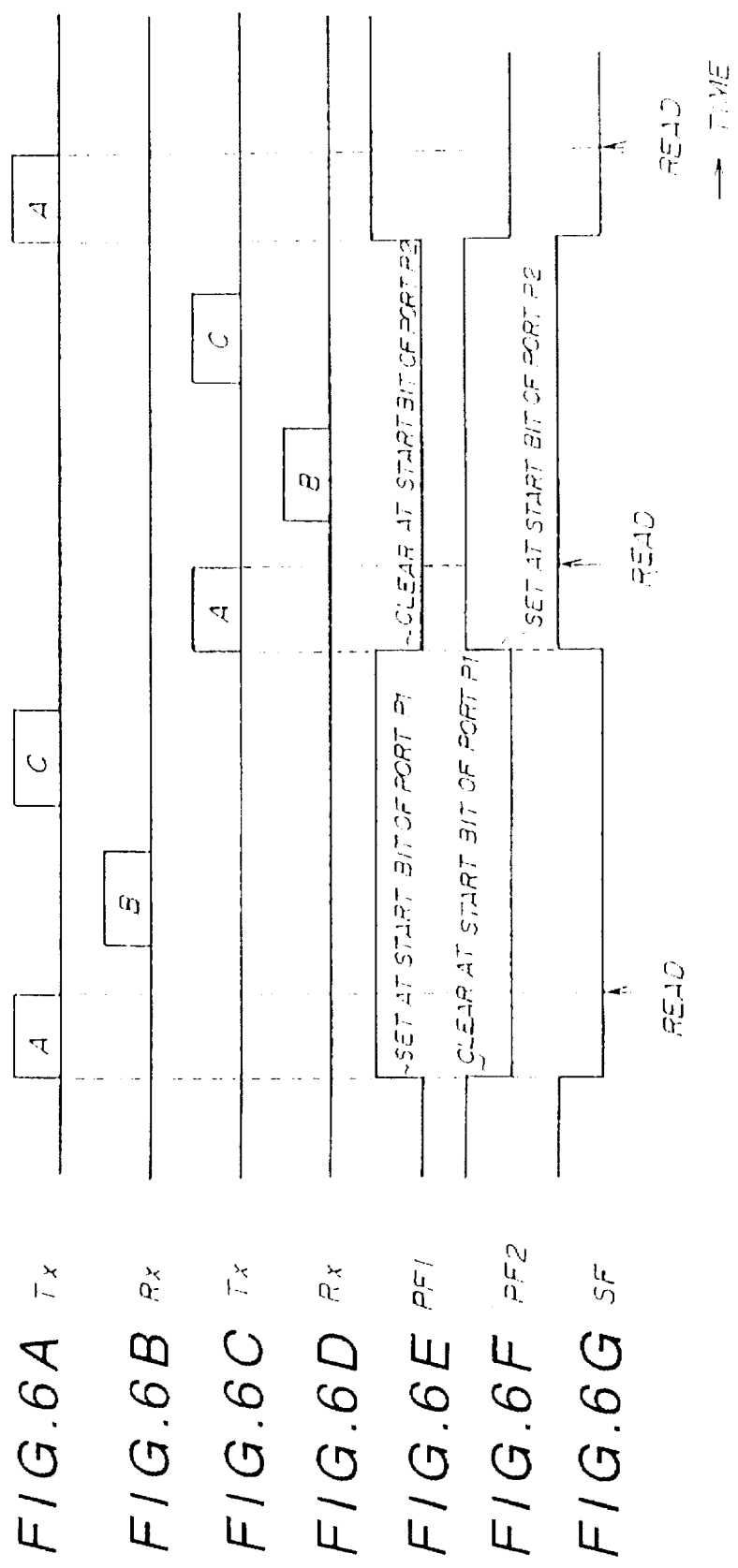

COMMUNICATION PORT CONTROL SYSTEM

This is a continuation of application Ser. No. 08/595,509, filed Feb. 1, 1996, which is a continuation of application Ser. No. 08/386,226, filed Feb. 9, 1995, which is a continuation of application Ser. No. 08/212,305, filed Mar. 14, 1994, which is a continuation of application Ser. No. 07/769,205, filed on Sep. 30, 1991 all abandoned.

BACKGROUND OF THE INVENTION

The present invention generally relates to communication port control systems, and more particularly to a communication port control system which controls the use of a communication port when communicating between a main station and a plurality of sub stations.

The scale of the recent transmission systems is increasing considerably, and a transmission supervision apparatus which is provided in a main station must supervise a large number of sub stations. For this reason, a large number of communication ports are required to make the supervision.

On the other hand, from the point of view of minimizing the space required to set up the equipments and minimizing the power consumption, there are demands to reduce the size of the equipments. In order to reduce the size of the equipments, it is necessary to effectively utilize the communication ports.

FIG. 1 shows an example of a communication port control system. In FIG. 1, a main station 2A includes a processing unit 20 and a plurality of communication control integrated circuits (ICs) 11A through 1NA. The communication control ICs 11A through 1NA are provided as communication ports in correspondence with sub stations $1_1$ through $1_N$. A communication between a sub station $1_i$ and the main station 2A is carried out independently through the corresponding communication control IC 1iA, where i=1, 2, . . . N.

However, according to the conventional communication port control system, it is necessary to provide within the main station 2A a number of communication control ICs corresponding to the number of sub stations. As a result, there are problems in that the mounting space of the communication control ICs becomes large when the number of sub stations is large, and that the control of the communication control ICs becomes complex when a large number of communication control ICs is provided.

SUMMARY OF THE INVENTION

Accordingly, it is a general object of the present invention to provide a novel and useful communication port control system in which the problems described above are eliminated.

Another and more specific object of the present invention is to provide a communication port control system which controls the use of communication ports for making a communication between a main station and a plurality of sub stations, comprising a processing unit for processing data received from the sub stations, a logical sum means for obtaining a logical sum of the data received from the sub stations and for supplying the logical sum to the processing unit via the communication ports, and judging means for judging a sub station number of the sub station from which the data received by the logical sum means originates and for supplying the sub station number to the processing unit, where the logical sum means receives the data from only one of the sub stations at one time. According to the communication port control system of the present invention, it is possible to use a single communication port as a plurality of communication ports, using a simple circuitry and simple control.

In an embodiment, the corresponding sub station has at least first and second ports. The judging means includes at least first and second NAND circuits. The NAND first circuit receives the data from the first port of the corresponding sub station and an output of the second NAND circuit, whereas the second NAND circuit receives the data from the second port of the corresponding sub station and an output of the first NAND circuit. The output of the first NAND circuit is supplied to the processing unit as a judgment flag indicative of the sub station number.

Other objects and further features of the present invention will be apparent from the following detailed description when read in conjunction with the accompanying drawings.

BRIEF DESCRIPTION OF THE DRAWINGS

FIG. 6 is a timing chart for explaining the operation of the embodiment shown in FIG. 3.

DESCRIPTION OF THE PREFERRED EMBODIMENTS

Figure 1:
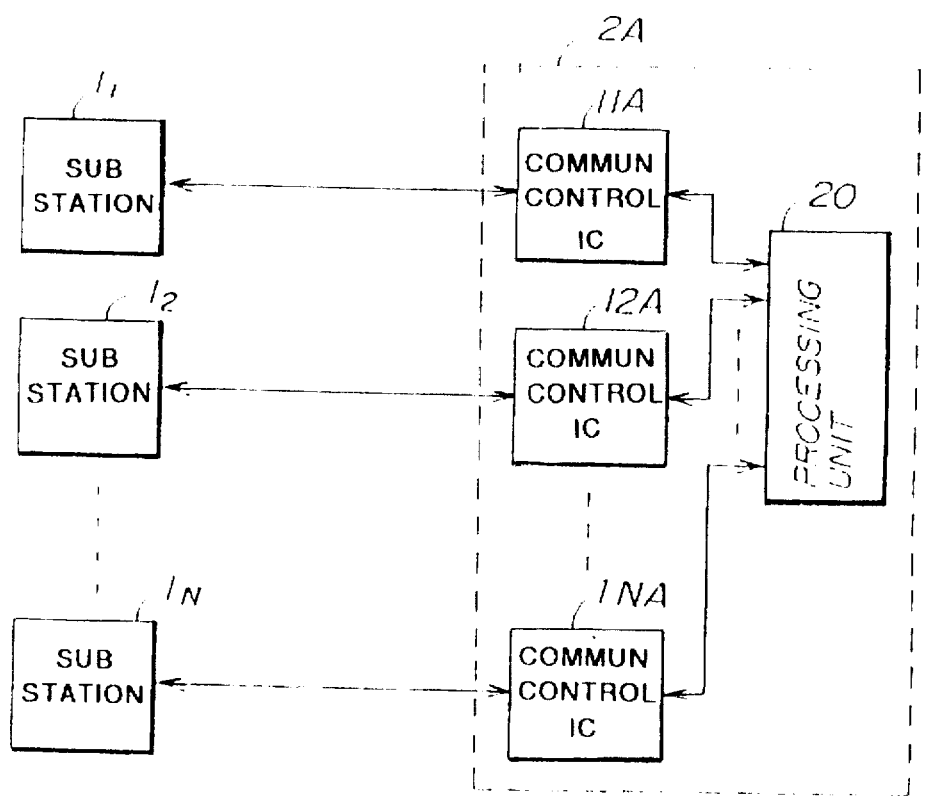
FIG. 1 is a system block diagram showing an example of a conventional communication port control system.
Figure 2:
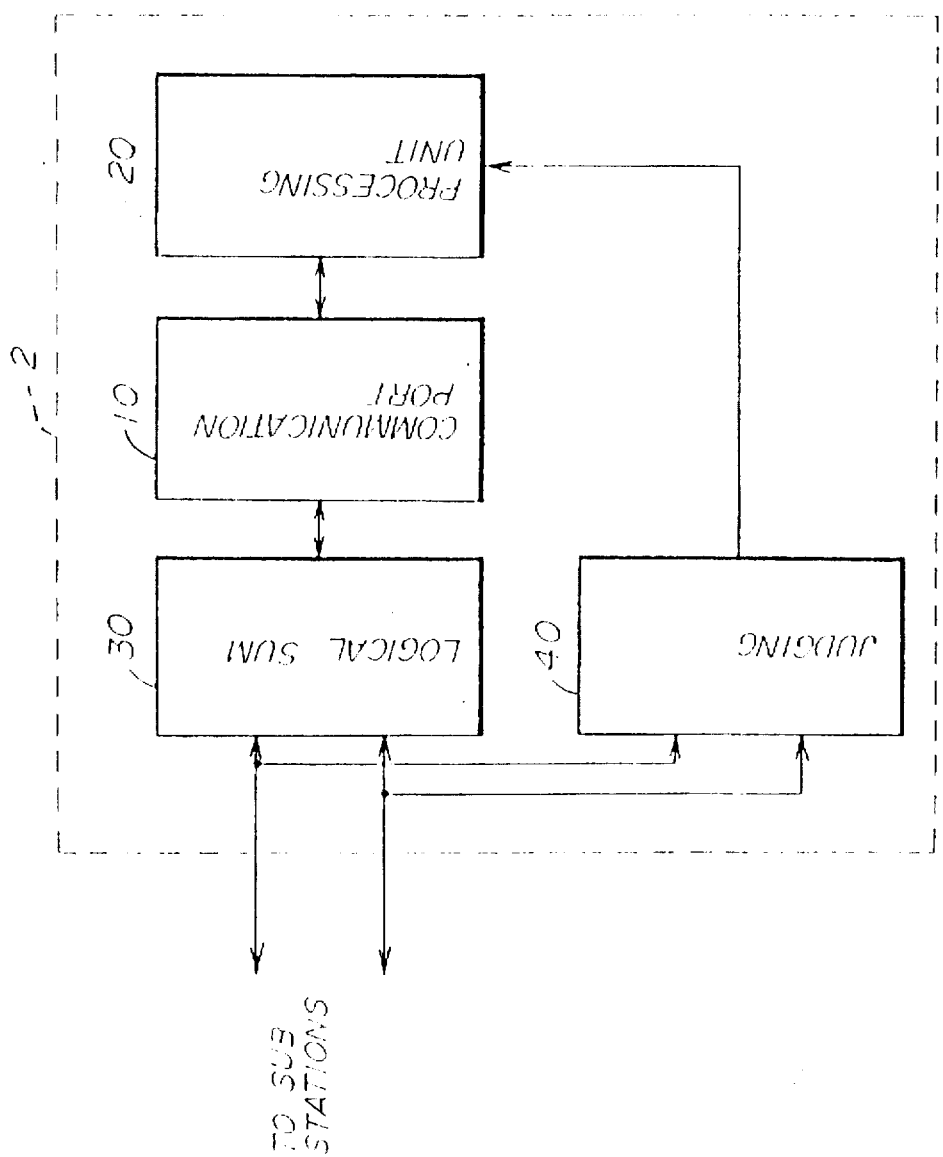
FIG. 2 is a system block diagram for explaining an operating principle of the present invention.

First, a description will be given of an operating principle of the present invention, by referring to FIG. 2. A main station 2 is used to communicate with sub stations (not shown). The main station 2 includes a communication port 10, a processing unit 20, a logical sum part 30 and a judging part 40. The communication port 10 carries out a communication control between the main station 2 and the sub stations. The processing unit 20 processes the data received from the sub station. The logical sum part 30 obtains a logical sum of the data received from the sub stations which are coupled to the main station 2. The judging part 40 judges a sub station number of the data received at the logical sum part 30, so as to judge the sub station number of the transmitting sub station which transmitted the data.

When the main station 2 communicates with the sub station, the received data is supplied to the judging part 40 to judge the sub station number of the transmitting sub station, and the judged sub station number is supplied to the processing unit 20. On the other hand, the logical sum part 30 obtains a logical sum of the received data and supplies the logical sum to the processing unit. The communication port 10 is used for the communication between the main station and the plurality of sub stations.

In other words, the sub stations are coupled to the communication port 10 via the logical sum part 30 on one hand, and are also coupled to the judging part 40 on the other. Hence when the data from the sub station is received at the main station 2, the judging part 40 judges the sub station number of the transmitting sub station and generates a judgement flag indicative of the judgement result. This judgement flag is supplied to the processing unit 20.

On the other hand, the logical sum part 30 obtains the logical sum of the data received at the main station 2, and the logical sum is supplied to the processing unit 20 via the communication port 10. The processing unit 20 carries out a processing while judging from the judgement flag the sub station from which the received data originates. Accordingly, the main station 2 can communicate with a plurality of sub stations via the communication port 10. When making the above communication, a control is carried out so that only one of the sub station transmits the data.

Next, a description will be given of an embodiment of a communication port control system according to the present invention, by referring to FIG. 3.

In this embodiment, it is assumed for the sake of convenience that two sub stations $1_1$ and $1_2$ are coupled to a main station 2, and each of the sub stations $1_1$ and $1_2$ have two communication ports $1^a$ and $1_b$. In other words, the main station 2 makes a communication via four ports P1, P2, P3 and P4, where the ports P1 and P2 are coupled to the ports $1^a$ and $1^b$ of the sub station $1_1$ and the ports P3 and P4 are coupled to the ports $1_a$ and $1_b$ of the sub station $1_2$.

The main station 2 includes a communication control IC 11 having two communication ports, the processing unit 20, OR circuits 31 and 32, and judging circuits 41 and 42. For example, a communication control IC μPD72001 manufactured by NEC of Japan may be used as the communication control IC 11. The OR circuit 31 obtains a logical sum of the data received via the ports P1 and P2, and the OR circuit 32 obtains a logical sum of the data received via the ports P3 and P4. These OR circuits 31 and 32 form the logical sum part 30 shown in FIG. 2. The judging circuit 41 is made up of NAND circuits 41A and 41B, and the judging circuit 42 is made up of NAND circuits 42A and 42B. The judging circuit 41 receives the data via the ports P1 and P2, and the judging circuit 42 receives the data via the ports P3 and P4. These judging circuits 41 and 42 form the judging part 40 shown in FIG. 2.

When data is received from the port P1 and a signal "1" is input to the NAND circuit 41A while a signal "0" is input to the NAND circuit 41B, a signal "0" is output from the judging circuit 41. On the other hand, when data is received from the port P2 and a signal "0" is input to the NAND circuit 41A while a signal "1" is input to the NAND circuit 41B, a signal "1" is output from the judging circuit 41. The output signal of the judging circuit 41 is supplied to the processing unit 20 as a judgement flag.

The processing unit 20 judges that the data is the data from the sub station $1_1$ received via the port P1 when the judgement flag is "0", and processes the data. On the other hand, when the judgement flag is "1", the processing unit 20 judges that the data is the data from the sub station $1_1$ received via the port P2.

When the data is received from the port P1, for example, a control is carried out so that no data is received from the port P2. Accordingly, in this case, the data received from the port P1 is passed through the OR circuit 31 as it is, and is supplied to the processing unit 20 via the communication control IC 11.

Similarly, when data is received from the port P3 and a signal "1" is input to the NAND circuit 42A while a signal "0" is input to the NAND circuit 42B, a signal "0" is output from the judging circuit 42. On the other hand, when data is received from the port P4 and a signal "0" is input to the NAND circuit 42A while a signal "1" is input to the NAND circuit 42B, a signal "1" is output from the judging circuit 42. The output signal of the judging circuit 41 is supplied to the processing unit 20 as a judgement flag.

The processing unit 20 judges that the data is the data from the sub station $1_2$ received via the port P3 when the judgement flag is "0", and processes the data. On the other hand, when the judgement flag is "1", the processing unit 20 judges that the data is the data from the sub station $1_2$ received via the port P4.

When the data is received from the port P3, for example, a control is carried out so that no data is received from the port P4. Accordingly, in this case, the data received from the port P3 is passed through the OR circuit 32 as it is, and is supplied to the processing unit 20 via the communication control IC 11.

Figure 3:
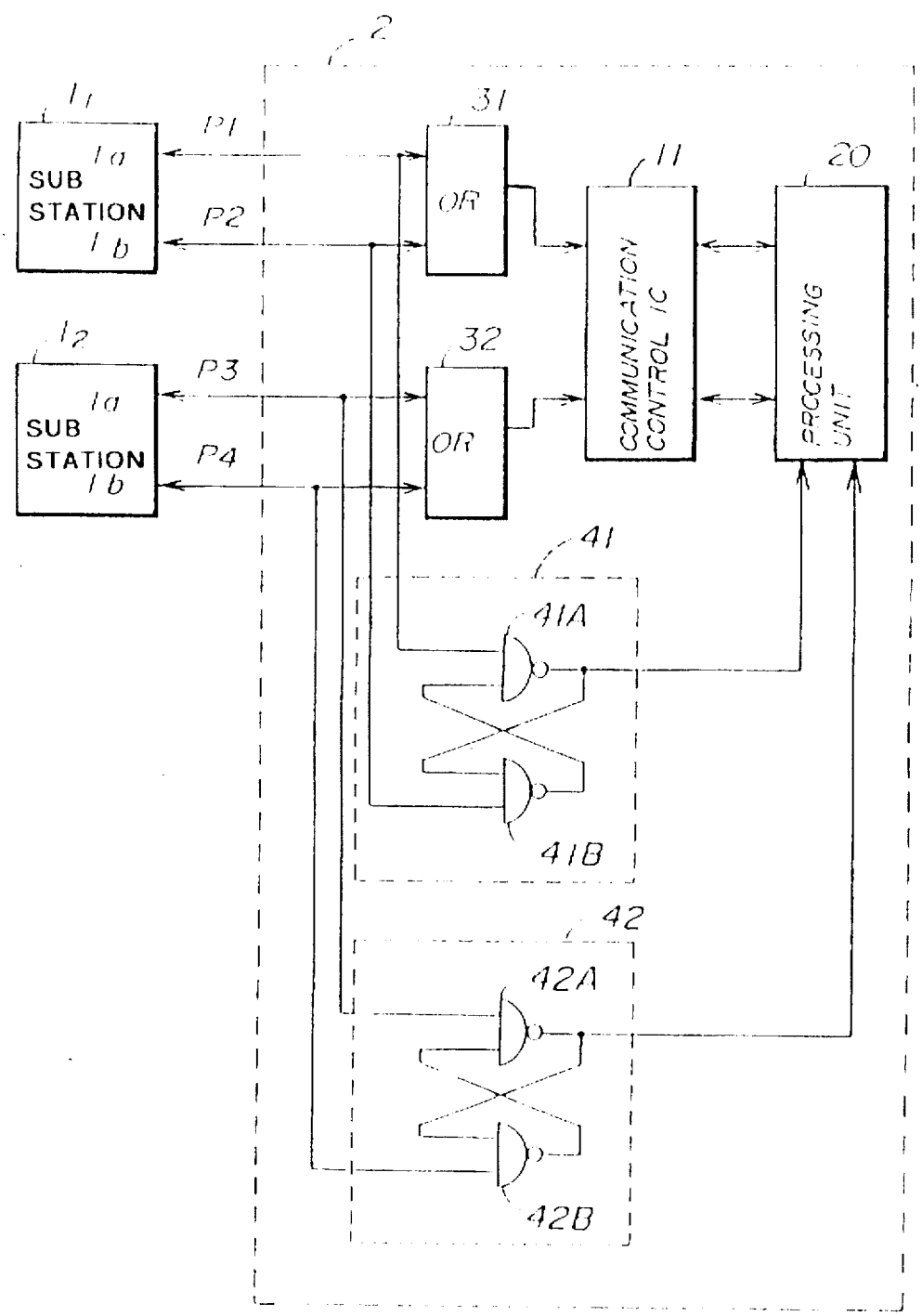
FIG. 3 is a system block diagram showing an embodiment of a communication port control system according to the present invention.
Figure 4:
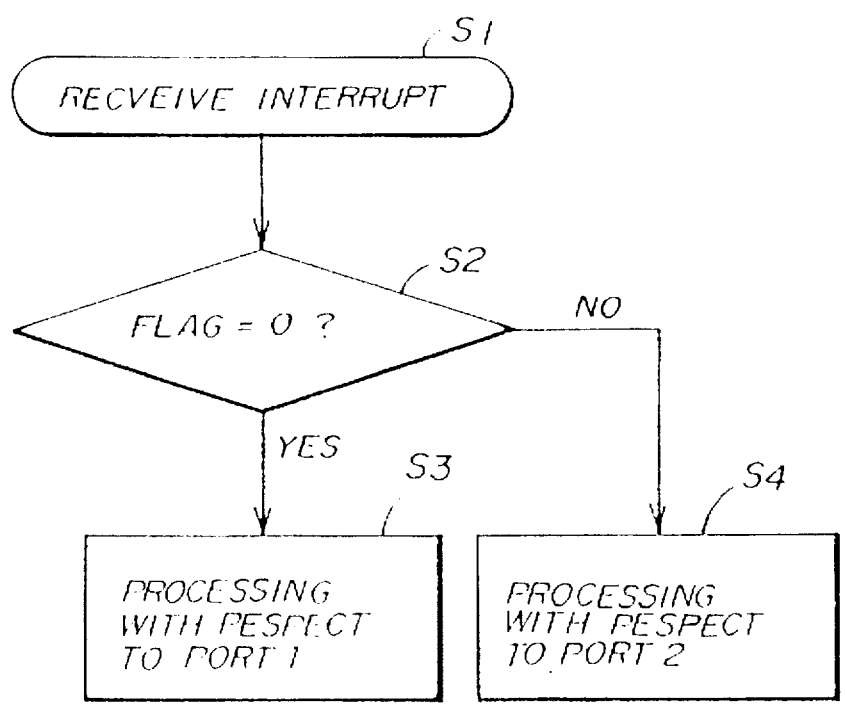
FIG. 4 is a flow chart for explaining an operation of the embodiment shown in FIG. 3.

FIG. 4 is a flow chart for explaining the operation of the processing unit 20 in the embodiment shown in FIG. 3. First, a step S1 receives a request for an interrupt process of the communication port. A step S2 decides whether or not the judgement flag is "0". If the decision result in the step S2 is YES, a step S3 processes the received data as the data received from the port P1. On the other hand, if the decision result in the step S2 is NO, a step S4 processes the received data as the data received from the port P2.

The judgement flag is generated by the judging circuit at the beginning of the data received at each port, and the judgement flag is maintained until the data is received at other ports.

Figure 5:
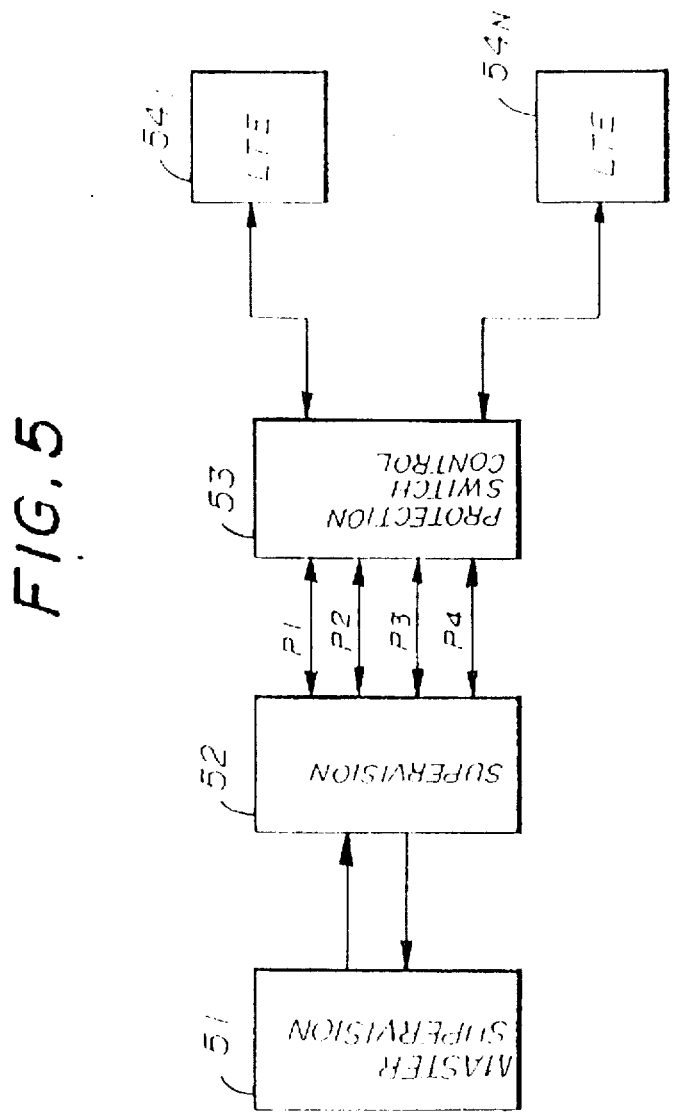
FIG. 5 is a system block diagram showing a communication system to which the embodiment shown in FIG. 3 may be applied.

FIG. 5 is a system block diagram showing a communication system to which the embodiment shown in FIG. 3 may be applied, and FIG. 6 is a timing chart for explaining the operation of the embodiment shown in FIG. 3.

The communication system shown in FIG. 5 includes a master supervision apparatus 51, a supervision part 52, a protection switch controller 53, and line terminating equipments $54_1$ through $54_N$ which are coupled as shown. The master supervision apparatus 51 supervises the line terminating equipments $54_1$ through $54_N$. When an abnormality is detected at a line terminating equipment $54_i$ for example, this abnormality is detected by the master supervision apparatus 51 via the protection switch controller 53 and the supervision part 52. The main station 2 corresponds to the protection switch controller 53, and the sub stations $1_1$ through $1_N$ respectively correspond to the supervision part 52. The supervision part 52 is provided to supervise a number of line terminating equipments $54_1$ through $54_N$ exceeding a number of line terminating equipments which can originally be supervised using the master supervision apparatus 51 alone.

In FIG. 6, "A" denotes a polling from the master supervision apparatus 51, "B" denotes a response from the supervision apparatus 52, and "C" denotes a reception response from the master supervision apparatus 51. In addition, "Tx" indicates a signal which is transmitted from the master supervision apparatus 51, and "Rx" indicates a signal which is received by the master supervision apparatus 51. FIG. 6(A), (B), (C), (D), (E), (F) and (G) respectively show the signal Tx received from the master supervision apparatus 51 via the port P1, the signal Rx transmitted to the master supervision apparatus 51 via the port P1, the signal Tx received from the master supervision apparatus 51 via the port P2, the signal Rx transmitted to the master supervision apparatus 51 via the port P2, the port flag PF1 corresponding to the port P1, the port flag PF2 corresponding to the port P2, and the soft flag (judgement flag) SF.

At the protection switch controller 53, a port flag PF1 is set to "1" and a port flag PF2 is cleared to "0" in response to a start bit of the signal Tx which is received from the port P1. On the other hand, the protection switch controller 53 clears the port flag PF1 to "0" and sets the port flag PF2 to "1" in response to a start bit of the signal Tx which is received from the port P2.

The port flags PF1 and PF2 are used to form the software flag (judgement flag) SF. By detecting this software flag SF, it is thus possible to judge which one of the ports P1 and P2 made the access. In FIG. 6, the timing with which the software flag SF is detected by the software (that is, the processing unit 20) is indicated by "READ".

In the described embodiment, the data from the sub station $1_i$, for example, is input to the single communication control IC 11 via the two ports P1 and P2. However, the present invention may be applied similarly when the number of ports is three or more. In this case, the judgement circuit is modified according to the number of ports, and the number of bits of the judgement flag is increased depending on the number of ports. The processing is carried out similarly as in the case of the embodiment by judging the sub station number.

Therefore, according to this embodiment, it is possible to realize a communication with a plurality of communication ports using a single port of the communication control IC 11, without the need for a complex structure or a complex control.

Further, the present invention is not limited to these embodiments, but various variations and modifications may be made without departing from the scope of the present invention.

What is claimed is:

1. A communication port control system which controls the use of communication ports for making a communication between a main station and a plurality of sub stations, each of said sub stations outputting data from only one of the communication ports at one time, said communication port control system comprising:

a processing unit processing data received from the sub stations;

a logical sum means for obtaining a logical sum of the data received from the sub stations and for supplying the logical sum to said processing unit via the communication ports; and judging means for judging a sub station number of the sub station from which the data received by said logical sum means originates and for supplying the sub station number to said processing unit so that said processing unit processes the data received from one of the sub stations indicated by said sub station number.

2. The communication port control system as claimed in claim 1, wherein said logical sum means includes an OR circuit which is coupled to a corresponding one of the sub stations for receiving the data from the corresponding sub station via a plurality of ports.

3. The communication port control system as claimed in claim 1, wherein the corresponding sub station has at least first and second ports, said judging means includes at least first and second NAND circuits, said first NAND circuit receives the data from the first port of the corresponding sub station and an output of the second NAND circuit, said second NAND circuit receives the data from the second port of the corresponding sub station and an output of the first NAND circuit, and the output of the first NAND circuit is supplied to said processing unit as a judgement flag indicative of the sub station number.

4. The communication port control system as claimed in claim 3, wherein said judging means judges the sub station number at a start bit of the data received from each of the first and second ports.

5. The communication port control system as claimed in claim 4, wherein said judging means maintains the judgement flag corresponding to the first port as it is until a data is received from the second port.

6. The communication port control system as claimed in claim 1, wherein a control is carried out so that said logical sum means receives the data from only one of the sub stations at one time, thereby enabling a communication with plurality of ports of each sub station using a single communication port.

7. The communication port control system as claimed in claim 1, wherein said processing unit processes the data received via said logical sum means and said communication ports as a data transmitted from a sub station having the sub station number received from said judging means.

8. The communication port control system as claimed in claim 1, which further comprises line terminating equipments which are coupled to said processing unit.

9. The communication port control system as claimed in claim 8, which further comprises a master supervision apparatus which is coupled to the sub stations for supervising the line terminal equipments.

10. The communication port control system as claimed in claim 1, wherein said processing unit, said logical sum means, said judging means and the communication ports form the main station.

11. A communication port control system which controls the use of communication ports for making a communication between a main station and a plurality of sub stations, said communication port control system comprising:

control means for controlling said sub stations such that said sub stations output data from only one of the communication ports;

a processing unit for processing data received from the sub stations;

a logical sum means for obtaining a logical sum of the data received from the sub stations and for supplying the logical sum to said processing unit via the communication ports; and judging means for judging a sub station number of the sub station from which the data received by said logical sum means originates and for supplying the sub station number to said processing unit so that said processing unit processes the data received from one of the sub stations indicated by said sub station number;

said logical sum means receiving the data from only one of the sub stations at one time to enable communication with a plurality of ports of each sub station using a single communication port between said main station and said sub stations.

* * * * *